(12) United States Patent
Sheldon

(10) Patent No.: US 7,325,919 B2
(45) Date of Patent: Feb. 5, 2008

(54) EYEWEAR HAVING LENS RETAINING MEMBER

(76) Inventor: Neville Sheldon, 315 Putney, St. Lambert, Quebec (CA) J4P 2B5

( * ) Notice: Subject to any disclaimer, the term of this patent is extended or adjusted under 35 U.S.C. 154(b) by 0 days.

(21) Appl. No.: 11/299,965

(22) Filed: Dec. 13, 2005

(65) Prior Publication Data

US 2007/0132944 A1    Jun. 14, 2007

(51) Int. Cl.
G02C 1/00 (2006.01)
(52) U.S. Cl. .......... 351/86; 351/154
(58) Field of Classification Search .......... 351/41, 351/83–86, 154, 178
See application file for complete search history.

(56) References Cited

U.S. PATENT DOCUMENTS

| | | | |
|---|---|---|---|
| 3,838,914 A * | 10/1974 | Fernandez | ............ 351/106 |
| 4,196,982 A | 4/1980 | Watkins | |
| 4,371,238 A | 2/1983 | Lhospice | |
| 4,689,838 A | 9/1987 | Angermann et al. | |
| 4,971,431 A | 11/1990 | Gerard | |
| 5,331,355 A | 7/1994 | Frank et al. | |
| 5,371,554 A | 12/1994 | Aspesi | |
| 5,494,615 A | 2/1996 | Wang Lee | |
| 5,526,068 A * | 6/1996 | Markovitz | ............ 351/44 |
| 5,631,716 A | 5/1997 | Chao | |
| 5,796,461 A | 8/1998 | Stepan | |
| 5,898,468 A | 4/1999 | Mage | |
| 6,074,059 A | 6/2000 | Glass et al. | |
| 6,086,199 A | 7/2000 | Holland et al. | |
| 6,394,600 B1 | 5/2002 | Horn et al. | |
| 6,592,220 B1 | 7/2003 | Cheong | |
| 6,676,257 B2 | 1/2004 | Sheldon et al. | |
| 6,692,124 B2 | 2/2004 | Katz et al. | |
| 6,899,427 B1 * | 5/2005 | Sheldon | ............ 351/178 |
| 6,938,277 B2 | 9/2005 | Lindahl | |
| 2006/0050227 A1 * | 3/2006 | Fernandez et al. | ............ 351/154 |
| 2006/0244897 A1 | 11/2006 | Guenther | |

FOREIGN PATENT DOCUMENTS

WO    WO2005081042    9/2005

* cited by examiner

*Primary Examiner*—Huy Mai
(74) *Attorney, Agent, or Firm*—Ogilvy Renault LLP

(57) ABSTRACT

Eyewear of the present invention includes a frame of substantially rigid material, at least one lens and a substantially rigid lens retaining member permanently engaging at least one lens. The lens retaining member extends along and projects radially and outwardly from at least a section of a periphery of the at least one lens. The outer edge of the lens retaining member is removably engaged with the frame.

18 Claims, 9 Drawing Sheets

EYEWEAR HAVING LENS RETAINING MEMBER

TECHNICAL FIELD

The present invention relates to eyewear, and more particularly to eyewear having a lens retaining member to form a lens unit which provides a selectable variety of properties to the eyewear to which the lens unit is attached.

BACKGROUND OF THE INVENTION

Conventional eyewear is generally catalogued into two groups. The first group includes swimming or diving goggles characterized by waterproof seals when the eyewear is in use. In this group, lenses are firmly secured to the eyewear structures, usually by flexible or semi-flexible sealing devices either integrated with the frame structures or additionally attached thereto, and flexible or semi-flexible seals are also provided to the frame structures to abut the user's face around the eyes, in order to prevent water from contacting the user's eyes.

The second group of eyewear includes a variety of eyeglasses, protective work glasses and particular types of sports goggles which are generally characterized as having no special sealing requirements. These eyewear, typically sunglasses and certain types of sports glasses generally include a frame structure made of substantially rigid material defining a pair of openings, for securing a pair of lenses fitted thereinto, for example, by a "click-in" action. Although the lenses can be replaced, for example when broken, they are generally not designed for interchangeable use.

In today's life, an eyeglasses user often needs more than one pair of glasses to meet various needs. For example, a sunglasses user may prefer a selected styling for general use, but prefer sunglasses with better ventilation for use during participation in sports activities. Conventional eyewear however, cannot provide interchangeable properties because the properties and styling thereof generally depend on the configuration of the frame which is not fabricated so as to be changeable.

Therefore, improved eyewear is desirable in order to overcome the shortcomings of the conventional eyewear.

SUMMARY OF THE INVENTION

One object of the present invention is to provide improved eyewear to overcome the shortcomings of conventional eyewear.

In accordance with one aspect of the present invention, there is a method provided for assembling at least one lens to a frame of eyewear. The frame is made of a substantially rigid material. The method comprises forming a substantially rigid lens retaining member with the presence of the at least one lens to thereby permanently engage the at least one lens. The lens retaining member extends along and projects radially and outwardly from at least a section of a periphery of the at least one lens, and removably engages an outer edge of the lens retaining member to the frame.

In accordance with another aspect of the present invention, there is eyewear which comprises a frame of a substantially rigid material with a head support, at least one lens and a substantially rigid lens retaining member permanently engaging the at least one lens. The lens retaining member extends along and projects radially and outwardly from at least a section of a periphery of the at least one lens. An outer edge of the lens retaining member is removably engaged with the frame.

The lens retaining member and the at least one lens form a permanently engaged lens unit according to the present invention, which advantageously provides options for selective properties of the eyewear in which the lens unit is included, independent of the frame configuration. The permanent engagement between the at least one lens and the retaining member provides a secure attachment of the at least one lens to the lens retaining member which in turn is securely but removably attached to the frame.

Other features of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 1A:
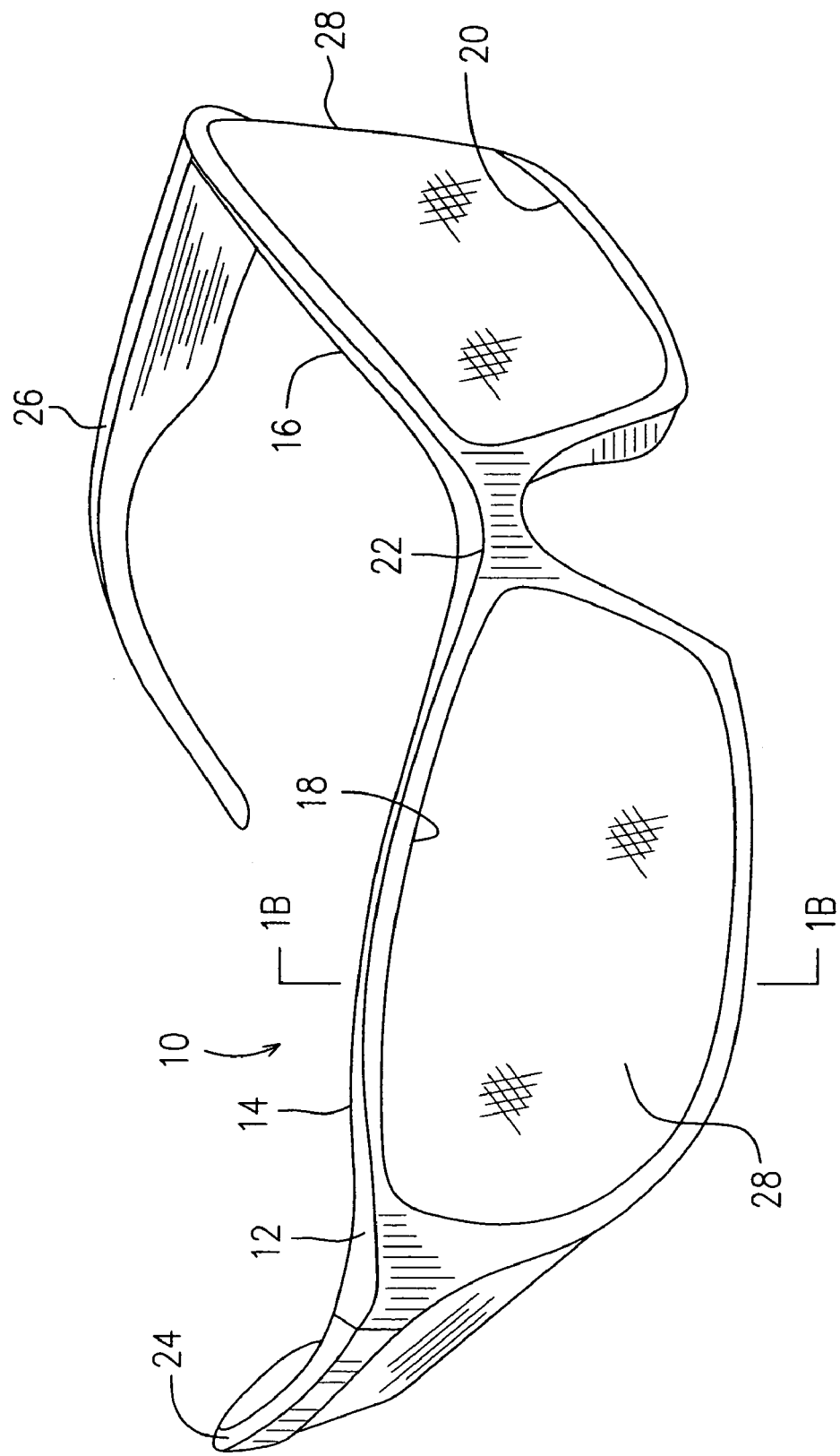
FIG. 1A is a perspective view of a pair of conventional sunglasses.
Figure 2B:
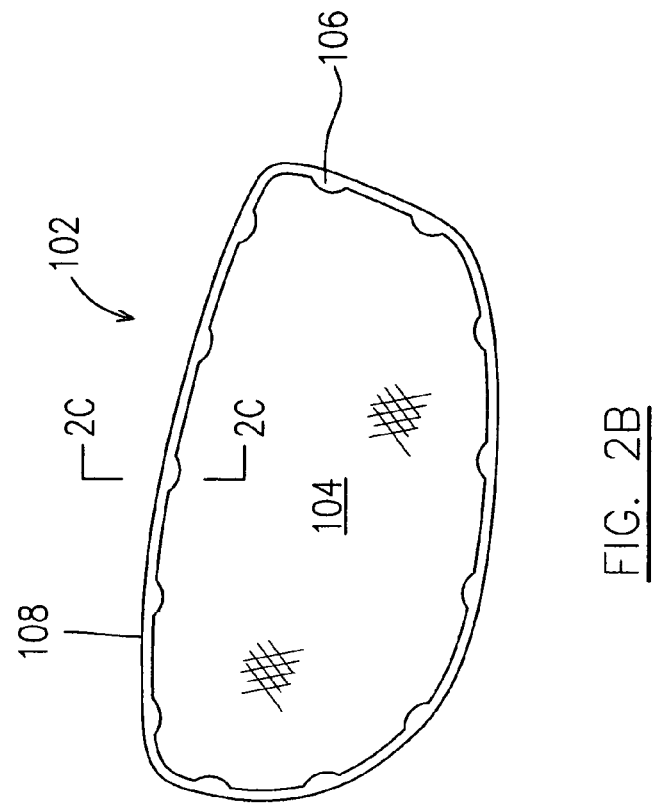
FIG. 2B is a front elevational view of a permanently engaged lens unit used in the sunglasses of FIG. 2A.
Figure 1B:
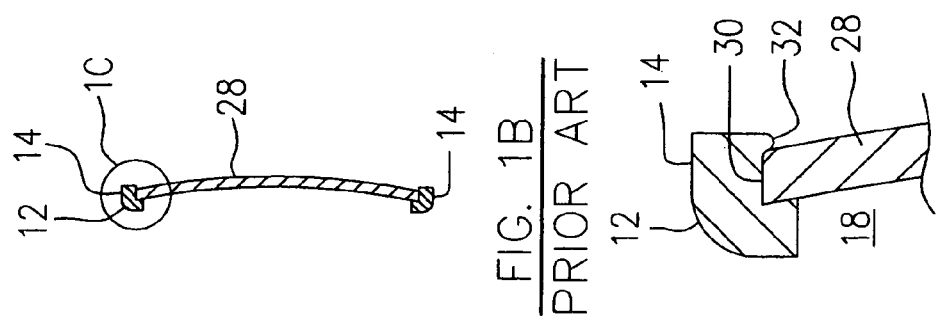
FIG. 1B is a cross-sectional view of the conventional sunglasses of FIG. 1A taken along line 1B-1B, showing conventional attachment of the lens to the frame structure.
Figure 1C:
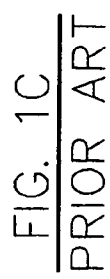
FIG. 1C is a partial cross-sectional view of the encircled area indicated as 1C in FIG. 1B, showing in greater detail, the attachment of the lens to the frame structure.

FIGS. 1A-1C illustrate a pair of conventional eyeglasses 10 which includes a frame structure 12 made of a substantially rigid material such as rigid plastics. The frame structure 12 generally includes two frame bodies 14, 16 defining apertures 18, 20 therein, respectively. A nose section 22 interconnects the two frame bodies 14 and 16, and extends between the inner ends thereof. A head support, for example, a pair of temples 24 and 26 made of a substantially rigid material, are each pivotably attached to the outer ends of the respective frame bodies 14, 16. Each of the frame bodies 14, 16 of the frame 12, has a lens 28 affixed within the respective apertures 18, 20.

In order to secure the lens 28 to the respective frame bodies 14, 16, the inner peripheries of the frame bodies 14, 16 which define the respective apertures 18, 20, each include a shallow circumferential recess 30. The lens 28 has a radial dimension to be snuggly fitted into the shallow recess 30, thereby being frictionally retained within the respective apertures 18 and 20 of the frame 12. The circumferential recess 30 usually includes a front edge section 32 extending slightly radially inwardly for a better retention of the lens 28 within the frame structure 12. Due to the substantially rigid property of the frame bodies 14, 16 and the lens 28 which is made of glass or substantially rigid transparent plastic, the inwardly extending front edge section 32 must be restrictively limited in dimension in order to allow for pressing the lens 28 into the respective apertures 18, 20 without damaging the lens 28 or the frame structure 12.

FIGS. 2A-2E illustrate eyewear, such as a pair of sunglasses, indicated by numeral 100 in accordance with one embodiment of the present invention. The sunglasses 100 are used as an example to illustrate one embodiment of the eyewear of the present invention. Nevertheless, any other type of eyewear which has a substantially rigid frame structure, such as prescription eyeglasses, protective work glasses, sports goggles, etc. are included in the concept of the present invention as illustrated by the embodiment 100 and by further embodiments described hereinafter.

The sunglasses 100 include a conventional frame structure which is similar to the frame structure 12 illustrated in FIG. 1A-1C. Similar components of the frame structure 12 as illustrated in FIGS. 2A-2E, are indicated by similar numerals and will not be described in detail.

The sunglasses 100 further includes a pair of lens units 102 removably attached to the frame structure 12 for covering the respective apertures 18, 20 thereof. The pair of lens units 102 are similar and symmetrical about a vertical center line (not shown) of the frame structure 12. Therefore, reference will be made to only-one of the lens units 102 attached to the frame body 14, for precision and convenience of description. For the same reason, description and reference will be made to only one of the pair of lenses, or lens units in further embodiments described hereinafter.

The lens unit 102 includes a lens 104 made of glass or substantially rigid transparent plastic. The lens 104 can be of any selected shading colour such as those conventionally used for sunglasses, but can also be of crystal clear transparency for other applications such as protective or prescription eyeglasses. A lens retaining member 106 is permanently engaged with the lens 104, preferably encircling the lens 104, as illustrated in this embodiment. The lens retaining member 106 extends along and projects radially and outwardly from the entire periphery of the lens 104 to thereby form an outer periphery 108 thereof, shaped and sized to be snuggly fitted into the circumferential hollow recess 30 in the inner periphery of the aperture 18 of the frame body 14.

Figure 2A:
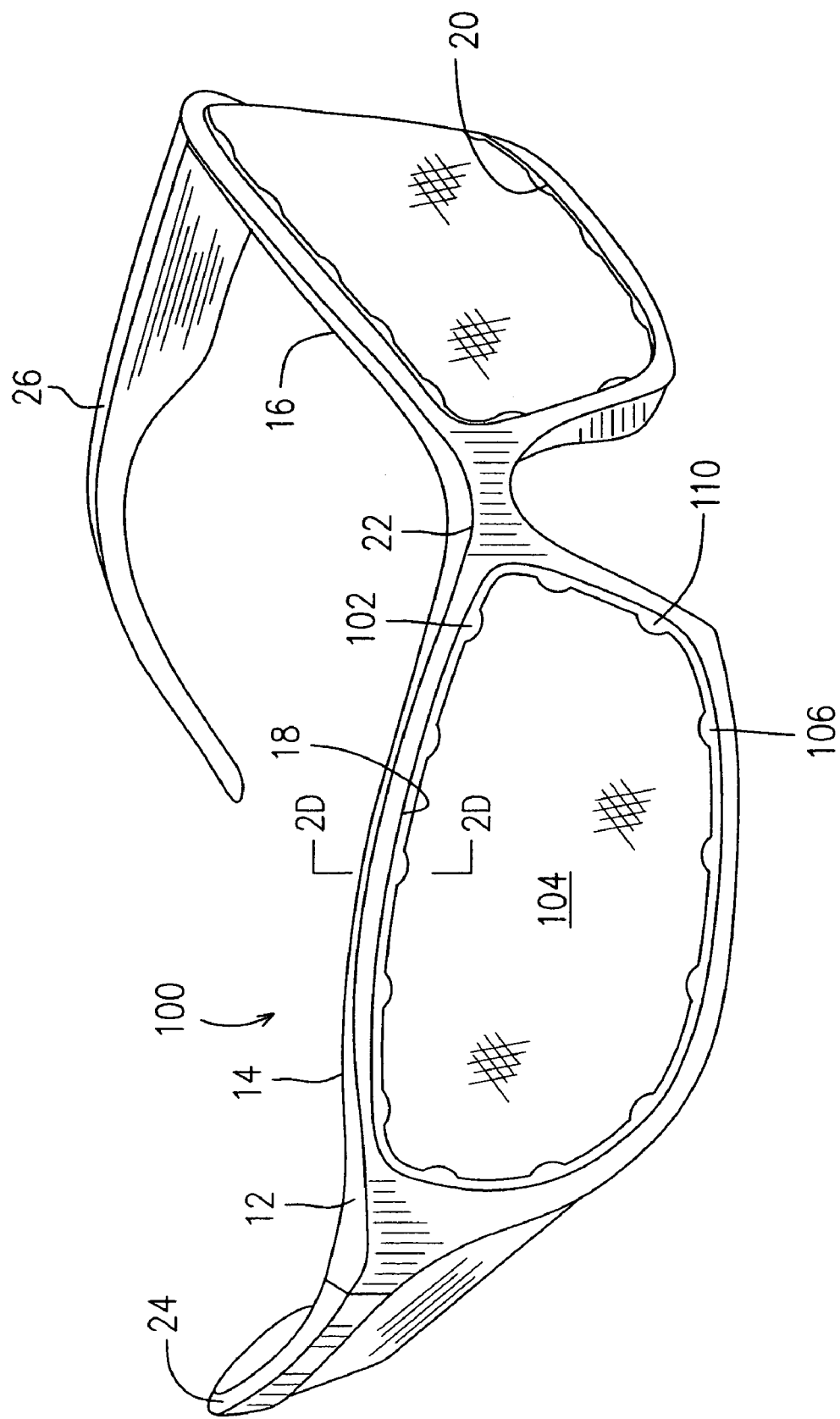
FIG. 2A is a perspective view of a pair of sunglasses, incorporating one embodiment of the present invention.

In this embodiment, a first group of engaging elements 110 integrally formed together with the lens retaining member 106, protrude radially and inwardly from the lens retaining member 106. A second group of engaging elements 112 also integrally formed together with the lens retaining member 106, protrude radially and inwardly from the lens retaining member 106. The respective first and second groups of engaging elements 110, 112 are spaced apart for receiving a peripheral portion of the lens 104 therebetween, thereby permanently engaging the lens 104 and the lens retaining member 106 together. The number and size of the respective first and second groups of engaging elements 110, 112 may be identical and may be disposed in the circumferential direction of the lens 104, to correspond one group with another as shown in FIG. 2D, but this is optional rather than necessary. The engaging elements 110, 112 must have a dimension thereof which is much greater than the total allowed maximum elastic deformation of the lens 104 and the lens retaining member 106, in order to prevent disengagement of the lens 104 from the engaging elements 110, 112, thereby ensuring permanent attachment of the lens 104 with the lens retaining member 106.

The lens retaining member 106 which is made of a substantially rigid material and encircles the periphery of the lens 104, is formed with the presence of the lens 104, thereby permanently engaging the lens 104 and creating a permanently engaged lens unit 102. Preferably, the formation of the lens retaining member 106 is completed in a molding process.

Figure 2C:
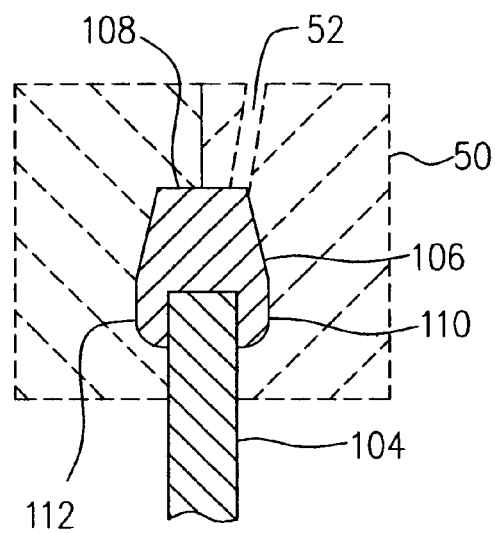
FIG. 2C is a partial cross-sectional view of the permanently engaged lens unit of FIG. 2B taken along line 2C-2C, showing a structural arrangement of this embodiment.

In FIG. 2C, a molding device 50 is indicated by broken lines schematically representing a partial cross-section thereof. The molding device 50 defines a cavity (not indicated) in accordance with a configuration of the lens retaining member 106 which includes the engaging elements 110, 112. The molding device 50 further includes a molding injection passage 52 communicating with the cavity in order to permit injection of the plastic material in an appropriate state, into the cavity during a formation molding procedure. This formation molding procedure is similar to a formation molding procedure of an eyewear frame structure with lenses permanently engaged thereto, which is described in Applicant's U. S. Pat. No. 6,899,427 issued on May 31, 2005, entitled LENS ATTACHMENT COMBINED WITH FORMATION OF EYE GLASSES FRAME, the specification of which is incorporated herein by reference.

Figure 2E:
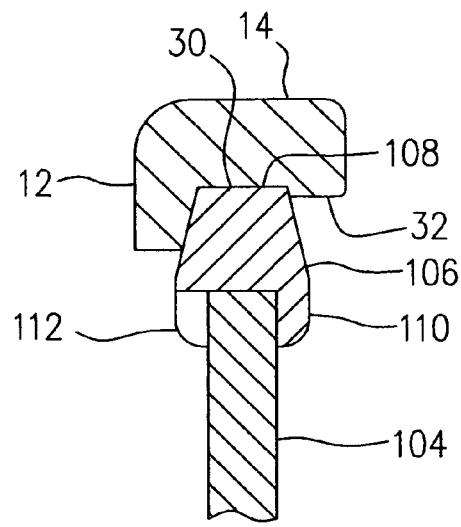
FIG. 2E is a partial cross-sectional view similar to that of FIG. 2D, showing another structural arrangement alternative to that of FIG. 2D.
Figure 2D:
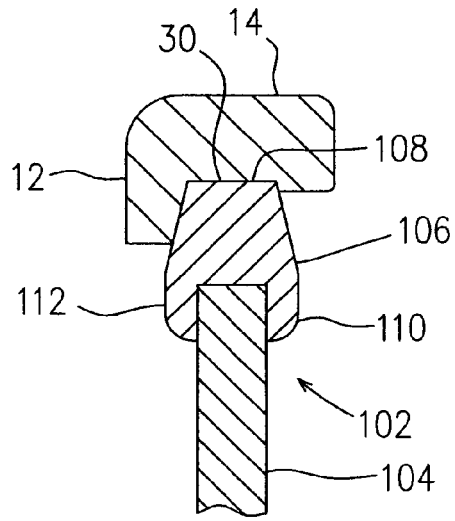
FIG. 2D is a partial cross-sectional view of the eyeglasses of FIG. 2A taken along line 2D-2D, showing a structure arrangement of this embodiment.

FIG. 2E illustrates an alternative structural arrangement of the embodiment shown in FIG. 2A. In this alternative structural arrangement, the second group of engaging elements 112 are positioned to be not aligned with the first group of the engaging elements 110, respectively. The first and second groups of the engaging elements 110, 112 are offset in the circumferential direction. This does not affect the permanent engagement of the lens retaining member 106 with the lens 104, provided that the dimension of the engaging elements 110, 112 of the structural arrangement of FIG. 2E is not smaller than those of the structural arrangement of FIG. 2D.

Figure 3B:
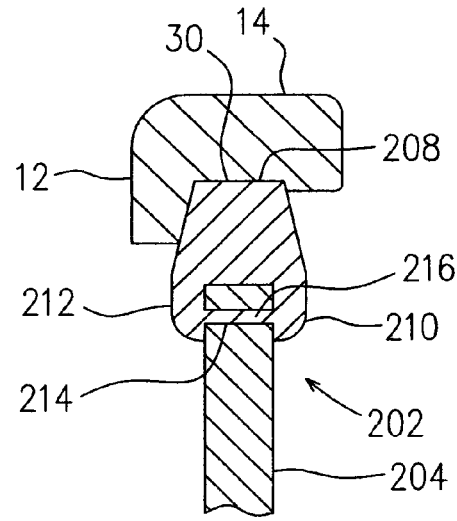
FIG. 3B is a partial cross-sectional view of the eyeglasses of FIG. 3A taken along line 3B-3B, showing a structural arrangement thereof.
Figure 3A:
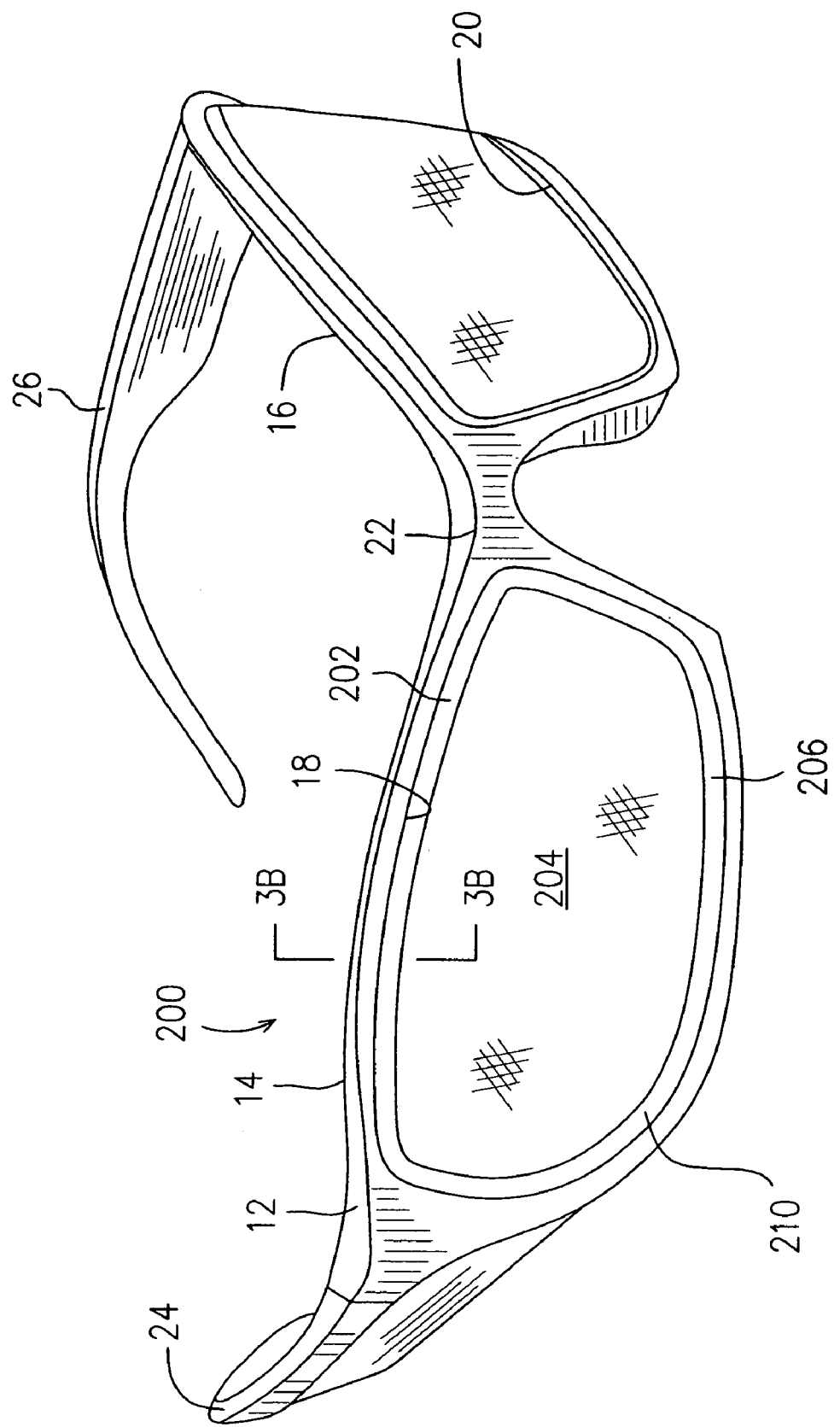
FIG. 3A is a perspective view of eyeglasses according to another embodiment of the present invention.

FIGS. 3A-3B illustrate another embodiment of the present invention in which a pair of eyeglasses 200 are similar to the embodiment of FIG. 2A. The frame structure and the components thereof as well as the head support of the eyeglasses 200, as an example of the present invention, are substantially similar to those of eyeglasses 100 of FIG. 2A which are indicated by the same numerals and will not be redundantly described herein. Similar to the retaining member 106 of the permanently engaged lens unit 102 shown in FIG. 2B, a retaining member 206 encircles a lens 204 of the eyeglasses 200. The embodiment shown in FIGS. 3A and 3B is a further development of the embodiment shown in FIGS. 2A-2E, and the difference therebetween lies in the permanently engaged lens unit 202. When the engaging elements 110, 112 of the eyeglasses 100 (as shown in FIG. 2A and 2D) are connected one to another in each group, these first and second groups of connected engaging elements substantially form opposed continuous side walls 210, 212 extending radially inwardly from the retaining member 206, thereby defining a continuous channel therebetween (not indicated). The continuous channel defined between the opposed side walls 210, 212 is configured to correspond with the periphery of the lens 204 for receiving same, and has a depth which is much greater than the amount of a total maximum elastic deformation of the lens 204 and the retaining member 206, in order to form the permanently engaged lens unit 202 when the attachment between the retaining member 206 and the lens 204 is completed during the formation of the retaining member 206.

The formation of the retaining member 206 is also completed with the presence of the lens 204, for example, in a molding process similar to that described with reference to FIG. 2C.

The permanently engaged lens unit 202, has an outer periphery 208 thereof configured to be snuggly fitted within the circumferential shallow recess 30 formed in the frame body 14 of the frame 12 such that the lens unit 202 is enabled to be removably attached to the frame 12 of eyeglasses 200.

Optionally, the lens 204 is provided with a hollow space therein, for example, a plurality of holes 214 extending therethrough and distributed along a peripheral portion of the lens 204. During the molding procedure of the retaining member 206 with the presence of the lens 204, a portion of the molding material which eventually forms the retaining member 206, is filled into the hollow space (the holes 214) of the lens 204, thereby forming a plurality of studs 216 integrated with the retaining member 206 and extending through the holes 214. The studs 216 thereby reinforce the permanent engagement of the lens 204 with the retaining member 206.

Figure 4A:
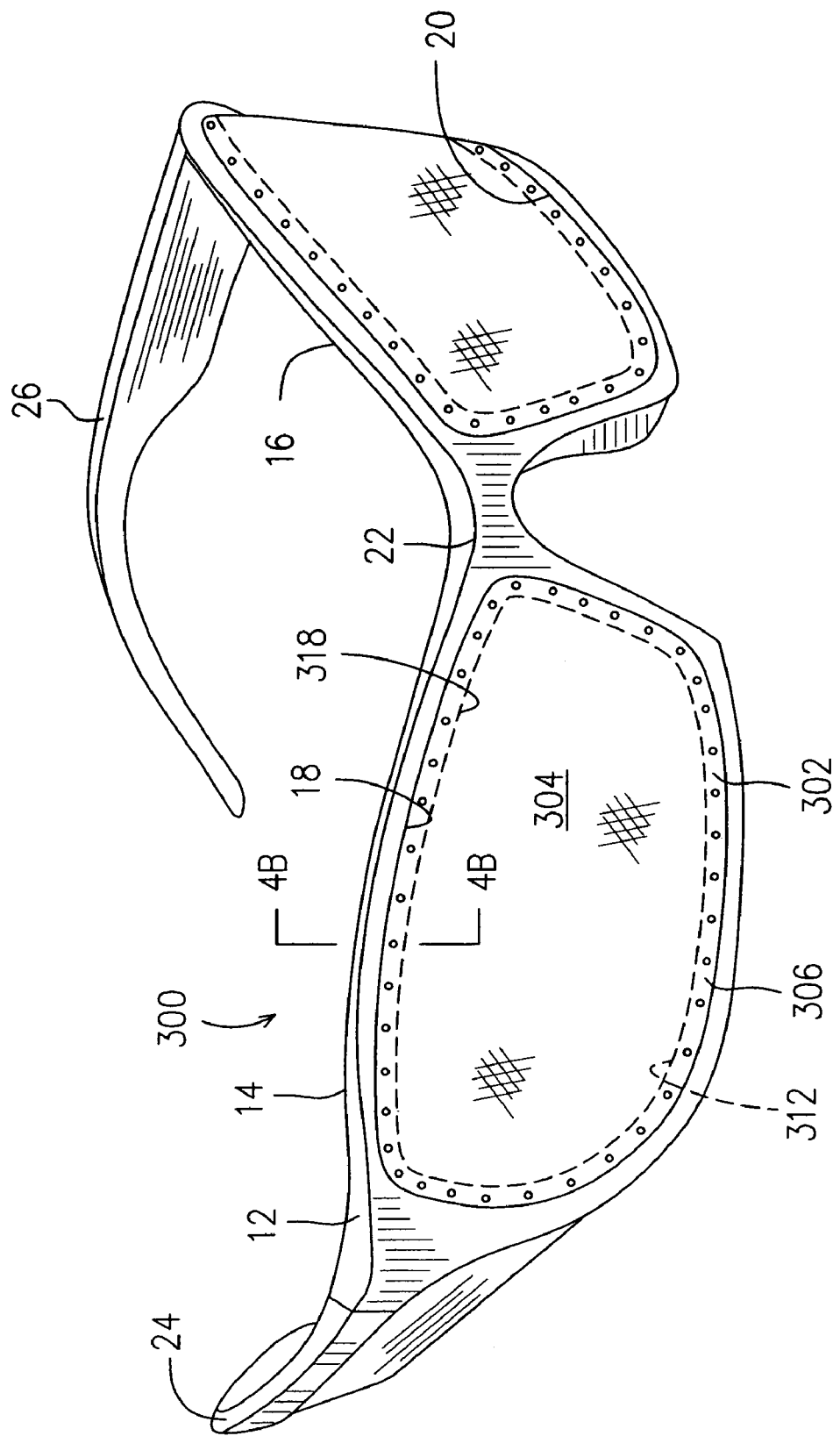
FIG. 4A is a perspective view of eyeglasses according to a further embodiment of the present invention.
Figure 4D:
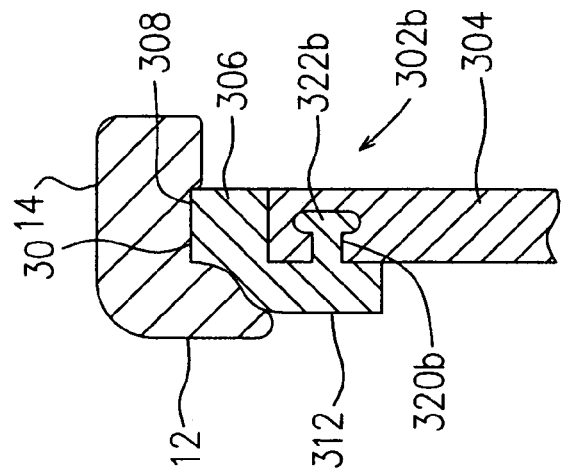
FIG. 4D is a partial cross-sectional view similar to that of FIG. 4B, showing a further structural arrangement alternative to that of FIG. 4B.
Figure 4C:
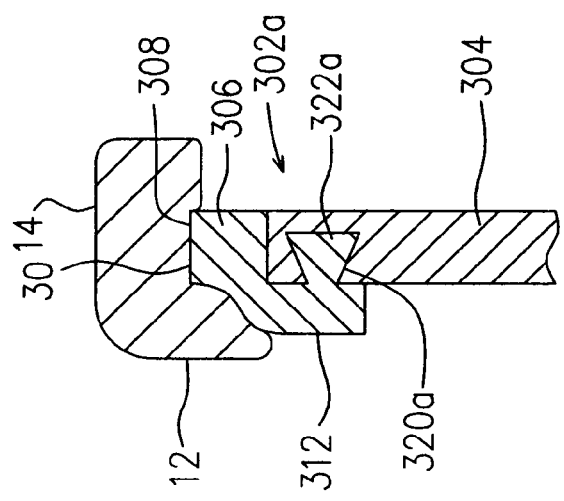
FIG. 4C is a partial cross-sectional view similar to that of FIG. 4B, showing a structural arrangement alternative to that of FIG. 4B.
Figure 4B:
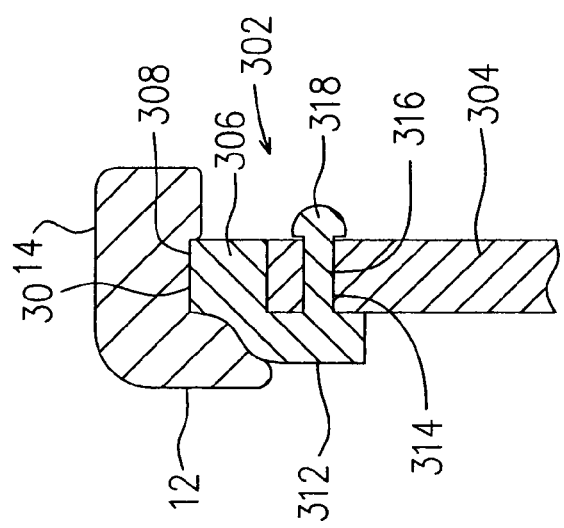
FIG. 4B is a partial cross-sectional view of the eyeglasses of FIG. 4A taken along line 4B-4B, showing the structural arrangement thereof.
Figure 5C:
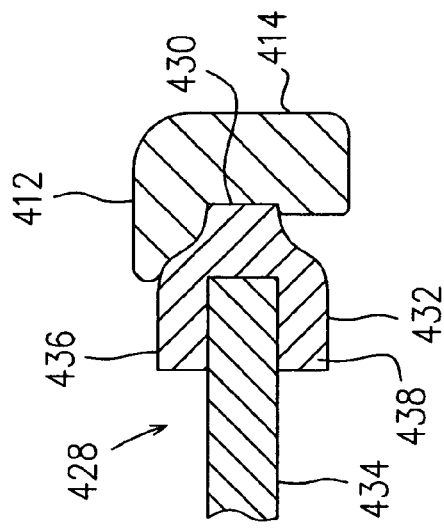
FIG. 5C is a partial cross-sectional view of the eyeglasses of FIG. 5A taken along line 5C-5C, showing a variation of the structural arrangement with respect to that of FIG. 5B.

FIGS. 4A and 4B illustrate a further embodiment of the present invention in which a pair of eyeglasses 300 have components similar to those of the eyeglasses 200 illustrated in FIG. 3A-3B. The similar components (the frame structure with the head support in particular) of eyeglasses 300 which are indicated by numerals similar to those of the embodiment of FIG. 3A-3B, will not be redundantly described herein. The difference between the eyeglasses 300 and the eyeglasses 200 of FIGS. 3A and 3B lies in that, instead of having opposed continuous side walls 210, 212 defining a continuous channel surrounding the entire periphery of the lens 204 as in FIGS. 3A and 3B, eyeglasses 300 has a lens 304 encircled by a retaining member 306 which includes only a rear side wall 312 extending radially inwardly from the retaining member 306 to abut a rear surface of the lens 304 along the entire periphery thereof. The lens 304 is provided with a hollow space, for example a plurality of holes 314, extending therethrough and distributed along the entire periphery of the lens 304. A plurality of studs 316 integrally formed with and projecting from the continuous rear side wall 312 extend through the respective holes 314. Each of the studs 316 has an enlarged end portion 318 thereof which has a size greater than the diameter of the hole 314 in order to prevent disengagement of the stud 316 from the hole 314. The studs 314 thereby permanently engage the lens 304 with the retaining member 306. The formation of the retaining member 306 with the integrated studs 314 and enlarged ends 318, is completed with the presence of the lens 304, for example, in a molding process using an appropriate molding device.

The retaining member 306 together with the lens unit 304 forms a permanently engaged lens unit 302 having an outer periphery 308 thereof configured to be snuggly fitted within the shallow recess 30 formed in the frame body 14 of the frame 12 such that the lens unit 302 is enabled to be removably attached to the frame 12 of eyeglasses 300.

In an alternative arrangement (not shown) the continuous rear side wall 312 can be replaced by a front side wall such that the plurality of enlarged ends 318 are disposed behind the lens 304, resulting in the front view of the eyeglasses 300 appearing to be similar to that of eyeglasses 200.

Figure 4E:
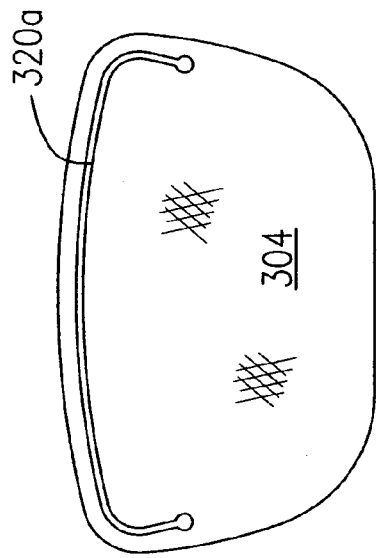
FIG. 4E is a rear elevational view of a lens used in the eyeglasses of FIG. 4C, showing a hollow space defined in the lens for permanent attachment of the lens retaining member.

FIGS. 4C-4E illustrate permanently engaged lens units 302a and 302b as an alternative configuration to the lens unit 302 of FIG. 4B, and are adapted for removable attachment to the frame 12 of eyeglasses 300 of FIG. 4A, thereby enabling replacement of the permanently engaged lens unit 302. In lens unit 302a, the lens 304 is provided with a hollow space defined as a groove 320a extending, for example, along the upper section of the peripheral portion of the lens 304 (as illustrated in FIG. 4E), for receiving a projecting member 322a integrated with the rear side wall 312 of the retaining member 306. The cross section of the groove 320a, has a bottom greater than the opening of the groove as shown in FIG. 4C, such that the complementary projecting member 322a which is preferably filled within the entire space defined by the groove 320a in a molding procedure, has an enlarged end. Thus, the lens 304 is permanently engaged with the retaining member 306 by the complementary groove 320a and the projecting member 322a. It is preferable to have enlarged cavities at the opposed ends of the groove 320a in the lens 304, for the convenience of the groove cutting process.

The lens unit 302b (as illustrated in FIG. 4D) has a function similar to that of the embodiment of FIG. 4C, and is similar in structure to the lens unit 302 except that the complementary groove 320b and projecting member 322b have a cross-section different from those of the embodiment of FIG. 4C.

Figure 5B:
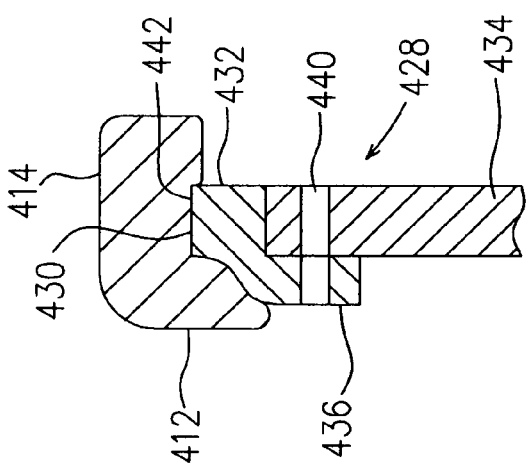
FIG. 5B is a partial cross-sectional view of the eyeglasses of FIG. 5A taken along line 5B-5B, showing ventilation passages therethrough.
Figure 5A:
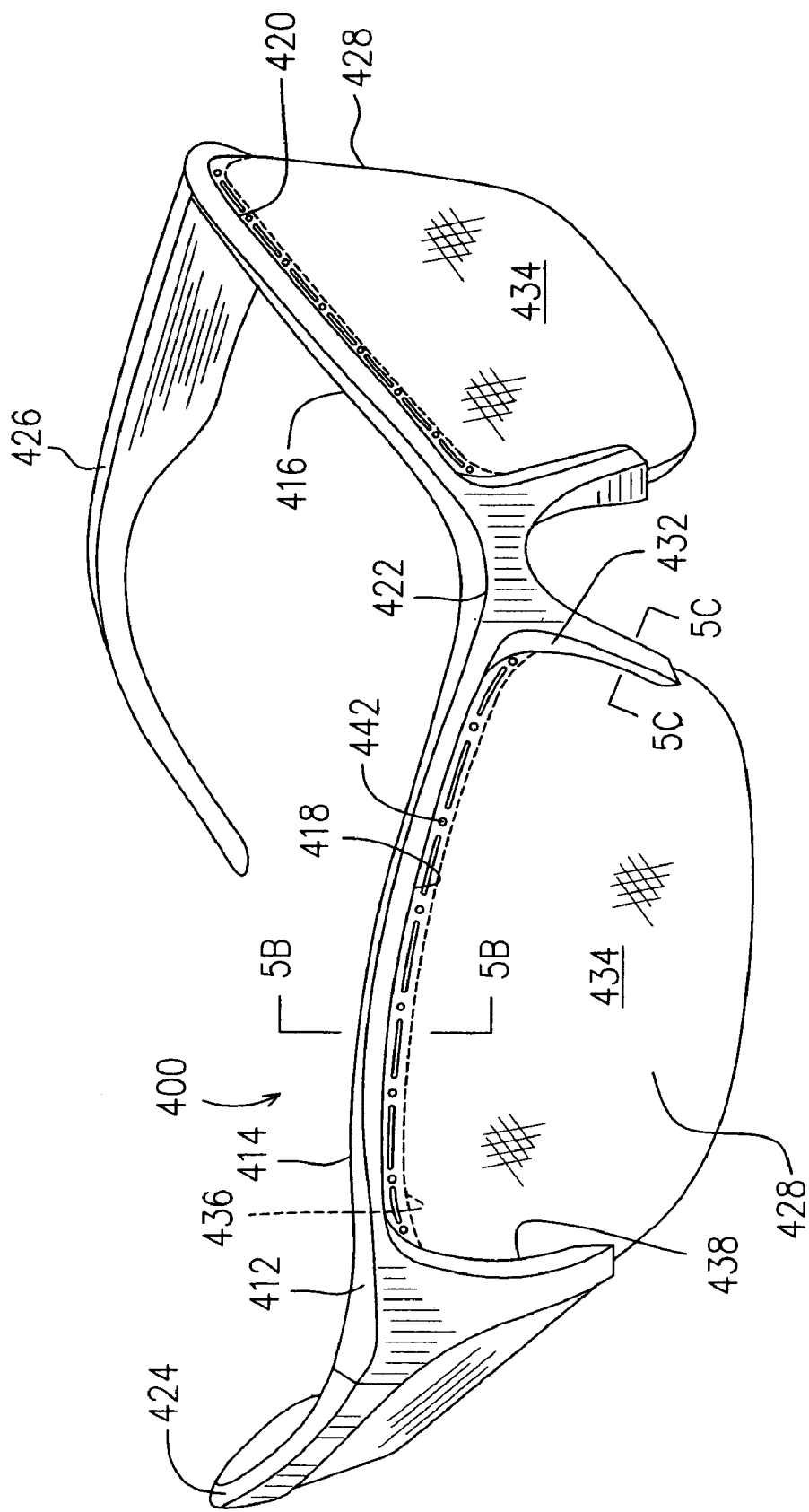
FIG. 5A is a perspective view of eyeglasses according to a still further embodiment of the present invention.

FIGS. 5A and 5B illustrate a further embodiment of the present invention in which a pair of eyeglasses 400 generally includes a frame structure 412 made of, for example, a substantially rigid plastic material. The frame structure 412 generally includes two frame bodies 414 and 416 each of the frame bodies 414, 416 has respective side portions (not indicated) spaced apart from each other and extending downwardly from an upper portion (not indicated) of the frame bodies, thereby defining an incomplete aperture 418 or 420 for receiving a removably attached lens unit 428. A head support such as a pair of temples 424, 426 which are preferably made of the same substantially rigid material, are pivotally attached to an outer end of the respective frame bodies 414, 416. A nose section 422 interconnects the two frame bodies 414, 416 and extends between the inner ends thereof. A shallow recess 430 is defined along an inner periphery of the incomplete aperture 418, 420 for removable attachment of the lens unit 428 thereto.

Each lens unit 428 has a lens retaining member 432 permanently engaging a lens 434 thereto. The lens retaining member 432 may encircle the entire periphery of the lens 434, as described in the previous embodiments. However, in this embodiment the lens retaining member 432 which has respective side sections spaced apart and extending downwardly from an upper section thereof, in correspondence with the configuration of the incomplete aperture 418, 420 defined by the frame body 414, 416, engages only an upper peripheral portion of the lens 434. The lens retaining member 432 has a continuous rear side wall 436 disposed along the entire inner periphery thereof and extending radially inwardly therefrom which abuts an inner surface of the lens 434. A front side wall 438 is provided at the respective side sections of the lens retaining member 432, extending radially inwardly therefrom, thereby forming a channel defined between the front and rear side walls 438, 436 which is disposed only at the respective side sections of the lens retaining member 432, for engaging a side peripheral portion (not indicated) of the lens 434 therein. A plurality of studs 442 with an enlarged end thereof integrally project from the upper section of the rear side wall 436 and engage with a plurality of holes (not indicated) provided in a supplementary upper peripheral portion of the lens 434, which is similar to the structural arrangement illustrated in FIG. 4B and will not be further described.

A plurality of openings 440 are provided through the upper section of the rear side wall 436 and further through the lens 434 to form ventilation passages of the eyeglasses 400. The openings 440 can be configured in various shapes, sizes and locations on the lens retaining member 432 to meet different requirements for ventilation and styling.

The permanently engaged lens unit 428 is removably attached to the frame structure 412 by means of the shallow recess 430 defined along the inner periphery of the incomplete apertures 418, 420 in each of the frame bodies 414, 416. The shallow recess 430 frictionally and releasably engages an outer periphery 442 of the lens retaining member 432, similar to those described in the previous embodiments. Because the incomplete apertures 418, 420 do not encircle the entire periphery of the permanently engaged lens unit 428, the space between the side portions of each of the frame bodies 414, 416 at the lowest ends thereof must be smaller than the space at any upper location thereof such that the permanently engaged lens unit 428 can be securely but releasably engaged within the respective incomplete apertures 418, 420 by a "click-in" action from the front side of the frame structure 412, and cannot be detached by moving the permanently engaged lens unit 428 in a downward direction with respect to the frame structure 412.

The removable attachment of the permanently engaged lens units to a frame structure of eyewear can be achieved in other structural configurations, for example, as described in Applicant's co-pending application Ser. No. 10/834,090 filed on Apr. 29, 2004 and entitled EYEWEAR HAVING LENSES WITH RIMS, the specification of which is incorporated herein by reference.

The permanently engaged lens units of the present, invention advantageously provide flexibilities and selections of properties to eyewear, independent of the eyewear frame structures. The permanent engagement between the lens and the lens retaining member ensures the secure attachment of the lens to the eyewear and reduces accidental loss of lenses from the eyewear.

Modifications and improvements to the above-described embodiment of the present invention may become apparent to those skilled in the art. For example, the ventilation openings can be configured in various types either in the lens retaining member or in the lens, and can also e defined by the combination of the lens retaining member and the attached lens. The described embodiments are illustrated as eyeglasses but other types of eyewear such as protective work goggles, sport goggles, and army masks can also be incorporated with the present invention. Generally, the present invention can be applicable to eyewear having various frame structures, from a simple top bar with pivotal temples at opposed ends thereof to a heavily configured goggle or mask frame to well cover an upper portion of a user's face, which cannot be exhaustively described herein. The structural arrangements of the permanent engagement between the lens and the lens retaining member can also vary from those of the described embodiments. The foregoing description is intended to be exemplary rather than limiting. The scope of the present invention is therefore, intended to be limited solely by the scope of the appended claims.

I claim:

1. A method for assembling at least one lens to a frame of eyewear, the frame being of a substantially rigid material, the method comprising:
    forming a substantially rigid lens retaining member with the presence of the at least one lens, to thereby permanently engage the at least one lens, the lens retaining member extending along and projecting radially and outwardly from at least a section of a periphery of the at least one lens; and
    removably engaging an outer edge of the lens retaining member to the frame.

2. The method as claimed in claim 1 wherein the formation of the lens retaining member is completed in a molding process.

3. The method as claimed in claim 2 further comprising a step of preparing the at least one lens with at least one hollow space defined therein, adjacent to said section of the periphery for receiving an engaging element of the lens retaining member formed during the molding process.

4. The method as claimed in claim 1 wherein the lens retaining member is formed to extend around an entire periphery of the at least one lens.

5. The method as claimed in claim 4 wherein an entire peripheral edge of the lens retaining member is removably engaged in at least one aperture defined in the frame.

6. The method as claimed in claim 4 further comprising forming first and second groups of engaging elements projecting from an inner peripheral edge of the lens retaining member during the molding process such that the respective first and second groups of engaging elements abut opposed sides of the at least one lens to form a permanent engagement with the at least one lens.

7. The method as claimed in claim 4 further comprising forming a continuous channel along an inner periphery of the lens retaining member during the molding process such that side walls of the continuous channel abut respective opposite sides of the at least one lens for permanent engagement therewith.

8. Eyewear comprising:
    a frame of a substantially rigid material with a head support;
    at least one lens; and
    a substantially rigid lens retaining member of a plastic material, the lens retaining member extending along and projecting radially and outwardly from at least a section of a periphery of the at least one lensand contacting a surface of one side of the at least one lens and at least another surface defined in a location other than at said one side of the at least one lens, thereby permanently engaging the at least one lens, an outer edge of the lens retaining member being removably engaged with the frame.

9. The eyewear as claimed in claim 8 wherein the lens retaining member comprises at least one engaging element engaged in a complementary hollow space defined in the at least one lens, adjacent to said section of the periphery thereof.

10. The eyewear as claimed in claim 9 wherein the hollow space is defined as a plurality of holes extending through the at least one lens.

11. The eyewear as claimed in claim 10 wherein the at least one engaging element comprises a plurality of studs integrally formed with the lens retaining member and extending through the holes.

12. The eyewear as claimed in claim 11 wherein each of the studs comprises an enlarged head thereof to prevent the stud from withdrawing from the hole.

13. The eyewear as claimed in claim 8 wherein the lens retaining member comprises at least one pair of spaced engaging elements integrally formed with the lens retaining member, the spaced engaging elements abutting respective opposed sides of the at least one lens for permanent engagement thereto.

14. The eyewear as claimed in claim 8 wherein the lens retaining member extends along the entire periphery of the at least one lens.

15. The eyewear as claimed in claim 14 wherein an entire outer peripheral edge of the lens retaining member is removably engaged in an aperture defined in the frame.

16. The eyewear as claimed in claim 8 wherein the permanently engaged at least one lens and lens retaining member formed as a unit, comprise an air passage extending therethrough for facilitating air ventilation when the eyewear is in use.

17. The eyewear as claimed in claim 8 comprising another lens and another rigid lens retaining member such that the both lenses are permanently engaged with the respective lens retaining members in a similar manner and the respective lens retaining members are removably engaged with the frame in a similar manner.

18. The eyewear as claimed in claim 17 wherein each of the lens retaining members comprises a pair of side sections spaced apart from each other and extending downwardly from an upper section thereof, thereby permanently engaging side peripheral portions and an upper peripheral portion of one of the lenses.

\* \* \* \* \*